Jan. 18, 1944.　　　C. L. QUILLEN　　　2,339,516
NAVIGATION MEANS
Filed March 19, 1942　　　2 Sheets-Sheet 2

INVENTOR,
CARL L. QUILLEN,
BY Minturn & Minturn
ATTORNEYS.

Patented Jan. 18, 1944

2,339,516

UNITED STATES PATENT OFFICE 2,339,516

NAVIGATION MEANS

Carl L. Quillen, Indianapolis, Ind.

Application March 19, 1942, Serial No. 435,256

2 Claims. (Cl. 33—75)

This invention relates to means for use in navigation, particularly of airplanes, and has for a primary purpose the easy and certain determination of the required direction of flight from an airport to a destination airport.

An important advantage of the invention is that it may be used not only at airport stations to predetermine the required course to the desired destination, but the construction is so simple and easily manipulated to permit its being carried in the airplane itself, which is an important factor when, due particularly to unforeseen conditions, the course is altered after leaving the airport.

Figure 1:
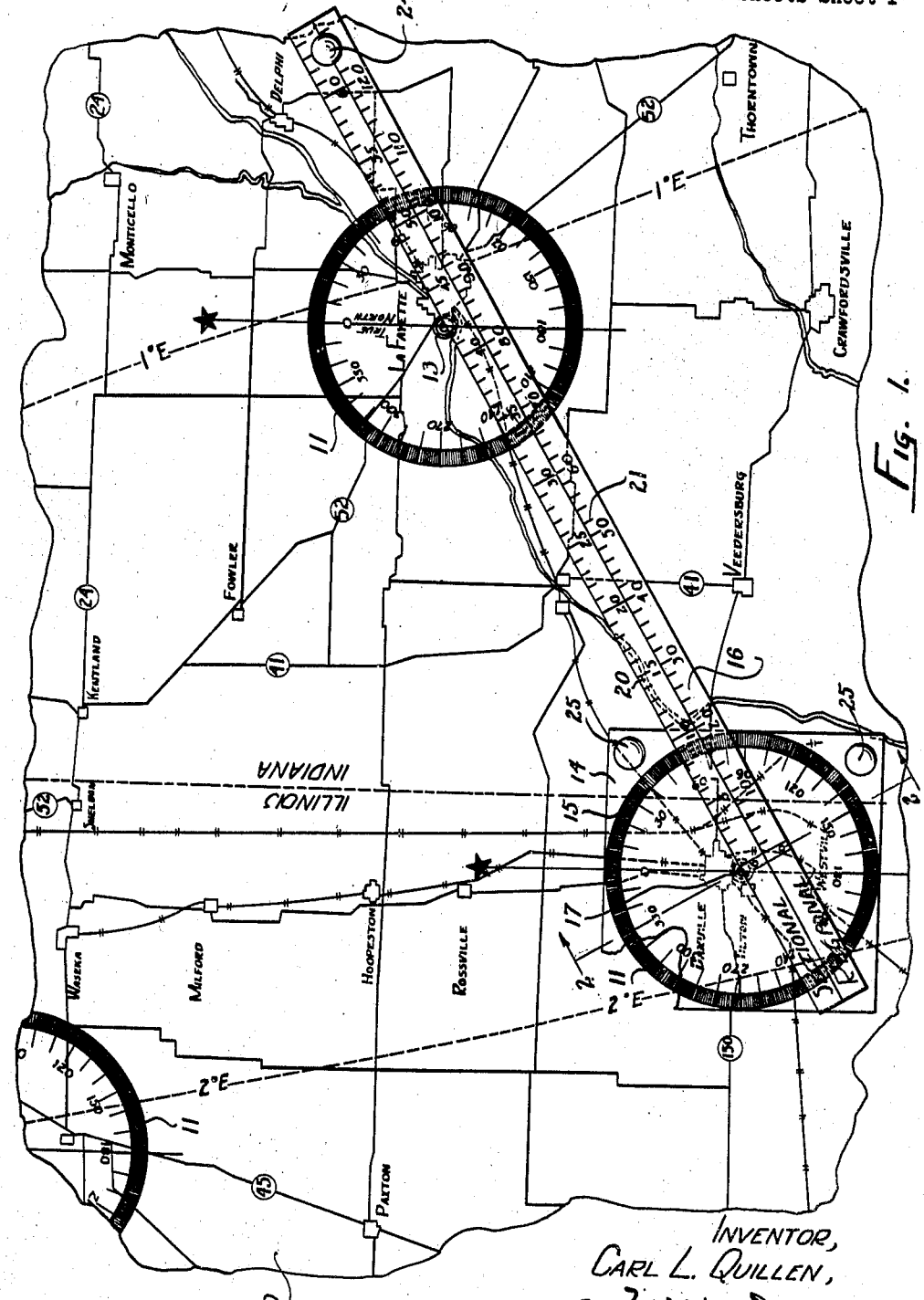
Figure 2:
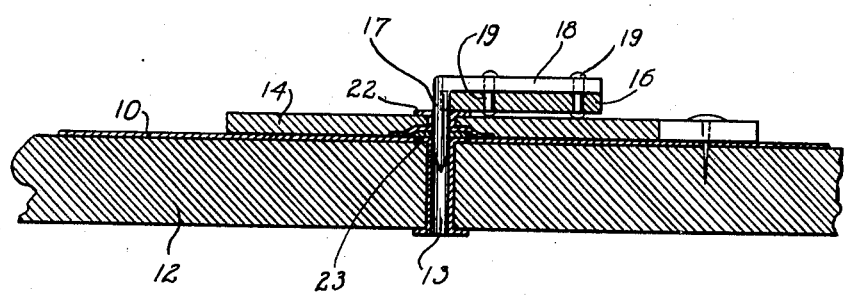
Figure 3:
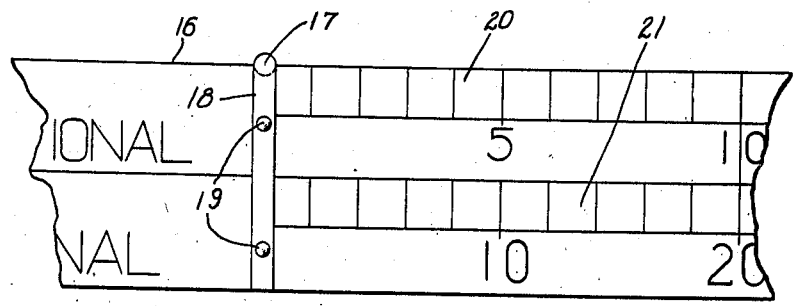

These and other important advantages and objects of the invention will become apparent to those versed in the art in the following description of one particular form of the invention as illustrated more or less diagrammatically in the accompanying drawings, in which Fig. 1 is a view in top plan of a fragment of a chart to which the invention is applied;

Fig. 2, a view in detail in vertical section on the line 2—2 in Fig. 1, on a greatly enlarged scale; and Fig. 3, a view in detail in top plan of a fragment of the length of a protractor arm.

Like characters of reference indicate like parts throughout the several views in the drawings.

Referring first to Fig. 1, the fragmentary showing of the chart 10 represents a part of the standard Chicago (U-7) sectional aeronautical chart as published by the U. S. Coast and Geodetic Survey, quite a few of the details of which, however, are omitted for the sake of clarity in the drawings. It is to be understood that the invention is intended to be applied to each sectional and regional chart so as to apply to the entire area of the United States. The invention, of course, may be likewise applied to similar charts for over-water use and for foreign countries where such charts are available.

In any event, to the standard form of chart 10 is added by imprinting thereon a compass rose 11 at every airport of any consequence appearing on the chart. In this regard, the rose 11 has its center coinciding with the center of its particular airport, and furthermore, the rose is aligned to have its north-south line in a true north alignment.

The chart 10 is suitably imprinted on or mounted on a board 12 to give some stiffness and thickness to the chart. This board 12, while serving as a substantial backing to the paper on which the chart 10 is imprinted, may be made sufficiently thin to permit rolling thereof. Referring to Fig. 2, where the board 12 and other associated parts are shown on a greatly magnified scale, a grommet 13 is axially aligned with the center of the airport and the center of the compass rose appearing therearound so that the bore through the grommet 13 is centrally disposed in reference to those two elements.

A protractor 14, herein shown as having a rectangular outline, has a compass card or rose 15 imprinted thereon to match in detail, preferably, and in size, the rose 11 in each instance. This protractor 14 is also made out of any suitable transparent material in order that the chart may be viewed therethrough when the protractor is laid against the chart.

A protractor arm 16 is made out of any suitable material that is transparent preferably and that is of a rather extended length in order to reach across major distances on the chart 10 in question. This arm 16 is provided with a downturned pin 17 near one end portion thereof. The axis of this pin 17 coincides with a vertical edge of the arm 16. As indicated in Fig. 2, this pin 17 is fixed to the arm 16, in the particular form shown, by having an overturned portion 18 thereof extending transversely across the top side of the arms 16 and engaged therewith by rivets 19. In any event the pin 17 is fixed to the arm 16 to become in effect an integral part therewith.

Referring to Fig. 1, this pin 17 is located along the edge of the arm 16 a sufficient distance from the end thereof to permit that end portion of the arm 16 to extend across the compass rose appearing on the protractor 14. The major portion of the arm 16 extends on beyond the other side of the pin 17 with a straight line edge on that side on which the pin 17 is mounted. The diameter of the pin 17 is made to be such that it will fit snugly within the bore of the grommet 13 when entered therein but will permit turning of the pin 17 therein so that the arm 16 may be swung around over the chart about the axis of the grommet 13. This arm 16 is preferably provided with not only a sectional chart mileage scale but also a regional chart mileage scale, the regional chart generally being on a scale half that of the sectional scale. As indicated in Fig. 3, the sectional scale 20 is placed along the marginal edge of the arm 16 extending from the pin 17 as the zero point while the regional scale 21 is spaced inwardly from the edge.

The protractor 14 is provided with a grommet 22 therethrough axially aligned with the center of the rose 15 appearing thereon, and is provided with an axial bore to receive the pin 17 slidingly therethrough so that the protractor 14 may thereby be aligned by means of the pin 17 with the bore of the grommet 13. Preferably the protractor 14 is rotatively secured on the pin 17 by any suitable means. One such means herein shown comprises the fixing of a washer 23 on the pin 17 within a counterbore in the grommet 22 from the under side thereof so as to prevent withdrawal of the pin 17 from the grommet 22 by means of this washer 23 abutting the under side of the grommet. The length of the pin 17 is made to be such that it will extend beyond the under side of the protractor 14 a sufficient distance to permit the pin to enter into the bore of the grommet 13 of the chart 10 to provide a substantial bearing.

Referring to Fig. 1, assuming that it is desired to make a flight from the Danville, Illinois, airport to the La Fayette, Indiana, airport, that particular sectional chart 10 is selected and the protractor 14 is placed over the Danville airport compass rose to coincide exactly therewith and have the pin 17 entered into the bore of the grommet 13 which designates the Danville airport. It is to be remembered that the protractor 14 is made of transparent material so that the compass rose thereunder may be readily observed in order to permit the matching therewith of the compass card on the protractor 14. Then the protractor arm 16 is swung around to have its upper edge carried to coincide with the vertical axial line of the bore through the grommet 13 which designates the La Fayette, Indiana, airport. In order to prevent shifting of the arm 16 from that position, a thumb tack 24, carried by the arm 16 to have its shank extending on therethrough, is pressed by its point into engagement with the chart 10. Likewise to prevent shifting of the protractor 14 rotatively around the axis of the pin 17, one or more thumb tacks 25 may be inserted through the protractor 14 into engagement with the chart 10 thereunder.

Since the upper edge of the arm 16 represents the line of flight to be taken between the two selected airports, the compass bearing may be read directly off the protractor 14 which, in the present showing, is substantially 59 degrees. Thereby the line of flight is immediately determined. While, of course, the two airports are relatively close together in the example selected, the same procedure is employed in going from one airport to a more distant airport. In that event, the usual allowance is made for the compass variations in accordance with the chart indications. Otherwise the procedure is exactly the same in determining the compass bearing. Also it is to be noted that by leaving the arm 16 in the position originally placed to determine the line of flight between the Danville and La Fayette airports, the compass bearing for the return trip may be read directly on the protractor, reading on the left-hand end of the arm which extends beyond the pivot 17. By providing the grommets in the chart 10, the chance for inaccuracy is removed since the protractor pin 17 is positively centered in each instance at the one airport, and the grommet appearing at the destination port makes that particular location stand out very prominently from all of the other surrounding indicia which, in many instances, becomes quite confusing by reason of its close spacing and even overlapping in some instances.

A further advantage in the invention is found in the fact that there is a compass rose 11 printed directly on the chart and centered on each airport. It has been the common practice to imprint the compass rose at random around over the chart without any particular reference to adjacent airports. This feature alone is of great aid in navigation particularly when a course once determined has to be altered due to arising conditions not foreseen. In this event the compass bearings may be taken directly from another airport to the position in which the airplane might be in order to determine a course to that particular port. In other words, the protractor 14 would be centered on that port and the arm 16 swung around to have its upper edge intercept with the known position of the plane in order to determine the revised course bearing.

While the invention has been described in one particular form more or less diagrammatically, it is obvious that structural changes may be employed without departing from the spirit of the invention and I therefore do not desire to be limited to that precise form beyond the limitations as may be imposed by the following claims.

I claim:

1. A protractor, a grommet in the protractor having a counterbore, a protractor arm, a pin fixed to the arm and centered on an edge of the arm and rotatably adjustable in the grommet, and a washer fixed to the pin and seated in the counterbore of the grommet.

2. A protractor, a grommet in the protractor having a counterbore, a protractor arm, a pin fixed to the arm and centered on an edge of the arm by having an overturned portion thereof across the arm and riveted to the arm, said pin being rotatably adjustable in the grommet, and a washer fixed to the pin and seated in the counterbore of the grommet.

CARL L. QUILLEN.